Oct. 4, 1966 M. E. ALAIS ETAL 3,276,105

METHOD FOR MAKING THERMOCOUPLES

Filed April 17, 1962

INVENTORS
MICHEL EMILE ALAIS
ROBERT CHARLES MOUTARDE
BY Robertson & Smythe
ATTORNEYS 3,276,105

METHOD FOR MAKING THERMOCOUPLES

Michel Emile Alais, Fresnes, and Robert Charles Moutarde, Sevres, France, assignors to Societe Alsacienne de Constructions Mecaniques, Mulhouse, Haut-Rhin, France, a corporation of France Filed Apr. 17, 1962, Ser. No. 188,068
Claims priority, application France, Apr. 18, 1961, 859,080
3 Claims. (Cl. 29—155.5)

The present invention relates to a method for making thermocouples for thermoelectric units employing either the Seebeck or the Peltier effects.

As is known, the manufacture of such units requires the assembly of a very large number of thermoelectric couples, consisting, for example, of bars or elements of two semi-conductive materials, N and P, in which the electric current, flowing through the units, flows alternately in bars or elements N and P; and to which end the couples must be placed in the appropriate relative positions.

An object of this invention is a method that absolutely assures that the bars or elements will be alternating order P and N, and that forms a very compact unit and yet may, however, comprise a very large number of bars.

Said method consists of making parallelepiped bars or elements from thermoelectric bodies of types P and N; of aligning the bars or elements thus obtained in a pattern, so that a small, empty space separates each bar or element from the other; of filling said space with some desirable insulating material, such as an insulating and bonding resin, so as to form a plate or sub-unit of bars or elements held together by said material; of juxtaposing a plurality of plates or sub-units thus obtained, leaving a small, empty space between each plate; and, finally, of filling these spaces between plates with the insulating material, so as to form a parallelepiped block in which each bar or element of one type is surrounded only by bars or elements of the other type.

The bars or elements can be obtained either by being cut out of or cut off from thermoelectric bodies of types P and N.

Alternately, the bars or elements can be moulded from a liquid or a powder.

The parallelepiped blocks can be made either directly in the desired size or of a length such that they can be transversely divided into sections to form small plates or mosaic sub-units that are used in the same way.

The method that is the object of the invention will now be described in greater detail, with reference to the accompanying drawings, in which.

Figures 1, 2, 3, 4, 5, 6:
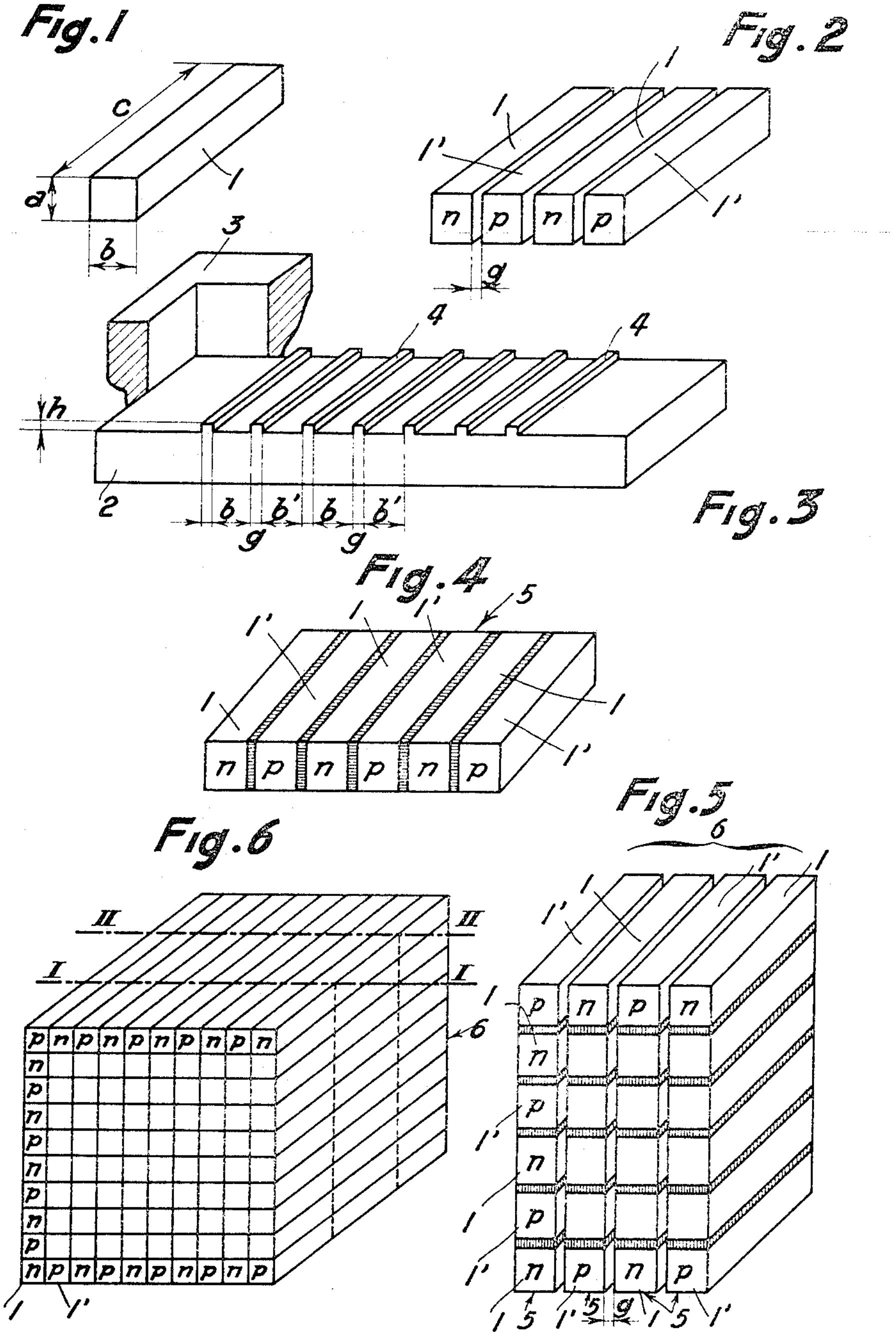
FIG. 1 shows a bar that is employed in the method.
FIG. 2 shows the relative positions of a plurality of juxtaposed bars.
FIG. 3 shows a pattern for assembling the bars.
FIG. 4 shows a plate of assembled bars.
FIG. 5 shows the relative position of a plurality of juxtaposed plates.
FIG. 6 shows a block of bars.

To better understand the method of the invention, we shall suppose, first of all, that from blocks or lumps of thermoelectric bodies of types P and N there have been cut off or cut out, using a diamond wheel or slitting saw, or in any convenient manner, parallelepiped bars 1 (FIG. 1), having dimensions $a \times b \times c$ for type P and $a' \times b' \times c'$ for type N.

To simplify, we may set $a=b$ and $a'=b'$, but this is not absolutely necessary. It is likewise desirable, but not indispensable, that $a=a'$, $b=b'$, and $c=c'$. In every respect, the order of the size of the relative dimensions should obey the relationship: $a$, $a'$, $b$, and $b'$ are approximately equal, the size of $c$ should be large with respect to $b$, for example $c=10b$.

Thus, if $b$ is 3 mm., $c$ will be 30 mm.

In accordance with the method, bars or elements 1 and 1' are placed side by side in such a pattern that there remains between them a clearance space $g$ (FIG. 2). Since parallelism between the bars or elements is preferable, bottom 2 of pattern 3 (FIG. 3) is provided with parallel ribs, ridges, or partition-walls 4 having a thickness equal to the desired clearance-space between the bars. The height $h$ of the ribs, ridges, or partition-walls 4 must always be much less than the thickness $a$ or $a'$ of the bars.

The bars or elements being thus set in the desired sequence in the bottom 2 of the pattern, into the clearance-spaces $g$ there is poured, for example, an appropriate insulating and bonding resin. The number of bars or elements coated is of little consequence. If the number is even, the two outer bars or elements will be of opposite polarity, which is suitable; if it is odd, the two outer bars or elements will be of the same type, type N, for example. It will then be necessary to make next a plate or sub-unit having its two outer bars or elements of type P.

When the coating is finished and the resin solidified, there is produced a plate or sub-unit 5, such as shown in FIG. 4.

A plurality of, plates or sub-units 5, mutually separated by a distance $g$, is then parallely arranged on a ribbed or ridged pattern similar to pattern 3. Resin is poured into clearance spaces $g$ and, after the resin has set, a parallelepiped block 6 (FIG. 6) is obtained.

It is obvious that plates or sub-units 5 will have to be so arranged in the pattern that the bars or elements are alternately N and P in the horizontal and vertical directions. On examination, it will be seen that each face of block 6 is a mosaic of bars or elements, in which each bar or element, whether type N or P, is respectively surrounded by opposite bars or elements type P or type N.

It is important that the number of bars or elements of type P be equal to the number of bars or elements of type N, lest there not be obtained a whole number of couples. Thus, it is necessary that the number of bars or elements per plate or sub-unit be even, or that the number of plates or sub-units be even, or that both be even.

The parallelepiped 6 can be used as is in a thermoelectric unit or it can be cut into sections along transverse lines I—I, II—II, etc. . . . to obtain small plates or mosaic sub-units having little type N and P elements alternately arranged in a check pattern. Whether the blocks 6 are used as is or whether they are divided into mosaic sub-units will depend on the use that is to be made of them or of the later treatments that such small plates or mosaic sub-units will have to undergo.

To use these blocks or small plates or mosaic sub-units, the bars or elements are connected together by means of conductive bridges secured respectively to the ends of neighboring N and P bars on one side, then to the other end of the said P bar and to the corresponding end of a further neighboring N bar, and so on, thereby forming a succession of couples in which the electric current circulates, entering by an end of a bar or element located, for example, in a corner of the block or small plate or mosaic sub-unit and leaving by another bar or element located, for instance, in a corner diagonally opposite to the input bar or element. The conductive bridges can be secured to the bars or elements by solder or by any other desirable means usually employed.

What we claim is:

1. The method of making parallelepipedic units from thermoelectric materials, comprising the steps: procuring two bodies of semi-conductive materials of N and P types respectively that, in combination, will form a thermocouple; forming a plurality of similarly sized parallelepipedic elongated elements from each of said bodies, arranging said elements within the grooves of a ribbed and grooved pattern device in spaced parallel relationship with every other element being of the same material and separated from its neighbor by a clearance space; filling the clearance spaces thus formed with an insulating and bonding material, thereby bonding together said elements into a sub-unit; removing the sub-unit from the pattern device; making a plurality of said sub-units; aligning said plurality of said sub-units with their surfaces in parallel within the grooves of a ribbed and grooved pattern device, such that there is a clearance space defined by a rib between successive sub-units and such that an element of one material has for its neighbors only elements of the other material; filling the clearance spaces thus formed with an insulating and bonding material, thereby bonding together said sub-units into a unit; and thereafter removing the assembly from the pattern device.

2. The method of making parallelepipedic units from thermoelectric materials, comprising the steps: procuring two bodies of semi-conductive materials of N and P types respectively that, in combination, will form a thermocouple; forming a plurality of similarly sized parallelepipedic elongated elements from each of said bodies; arranging said elements within the grooves of a ribbed and grooved pattern device in spaced parallel relationship with every other element being of the same material and separated from its neighbor by a clearance space; filling the clearance spaces thus formed with an insulating and bonding material, thereby bonding together said elements into a sub-unit; removing the sub-unit from the pattern device; making a plurality of said sub-units; aligning said plurality of said sub-units with their surfaces in parallel within the grooves of a ribbed and grooved pattern device, such that there is a clearance space defined by a rib between successive sub-units and such that an element of one material has for its neighbors only elements of the other material; filling the clearance spaces thus formed with an insulating and bonding material, thereby bonding together said sub-units into a unit, the said bars having a square section; and thereafter removing the assembly from the pattern device.

3. The method of claim 1, having the additional step of serially electrically connecting individual elements of one material to individual elements of the other material, thereby forming a succession of thermocouples.

References Cited by the Examiner

UNITED STATES PATENTS

| | | | |
|---|---|---|---|
| 2,017,587 | 10/1935 | Dennis | 52—389 |
| 2,651,079 | 9/1953 | Michaelson et al. | 264—162 |
| 2,752,662 | 7/1956 | Crooks. | |
| 2,947,150 | 8/1960 | Roeder | 136—4.2 |
| 2,980,746 | 4/1961 | Claydon | 29—155.5 |
| 3,066,387 | 12/1962 | Herbst | 29—155.54 |

FOREIGN PATENTS

| | | |
|---|---|---|
| 1,072,410 | 12/1959 | Germany. |

JOHN F. CAMPBELL, *Primary Examiner.*

C. I. SHERMAN, W. I. BROOKS, *Assistant Examiners.*